May 2, 1967            C. HILSUM            3,317,730
DETERMINING ATMOSPHERIC POLLUTION BY THE DETECTION
OF BACKSCATTERED INFRARED RADIATION
Filed April 9, 1964
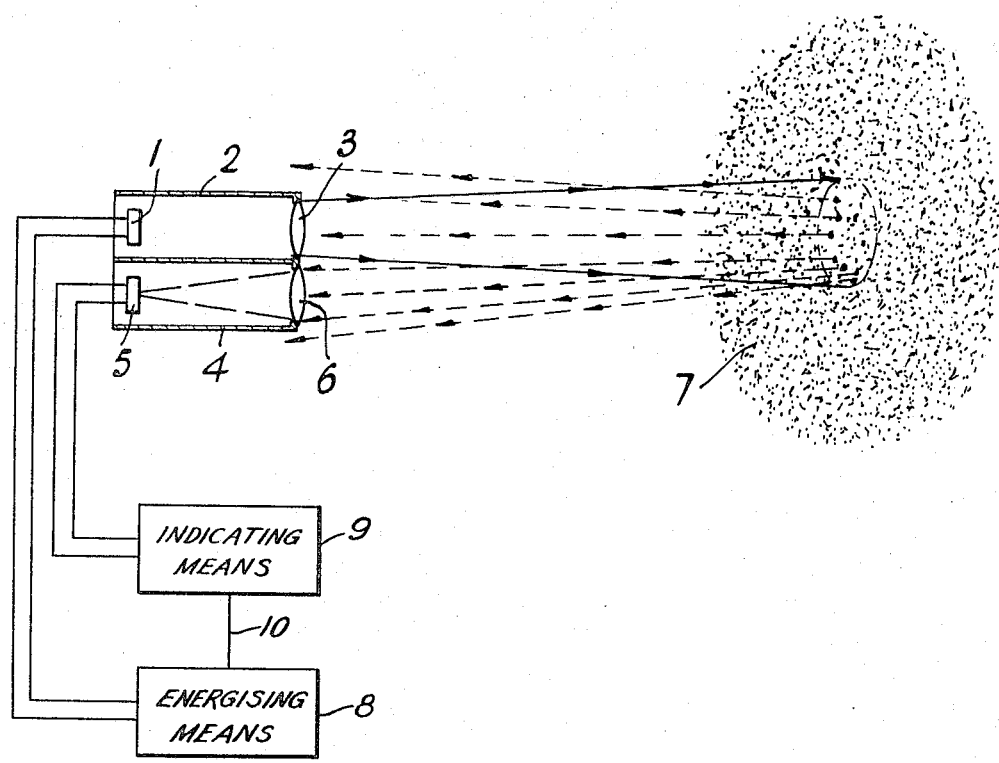

United States Patent Office 3,317,730
Patented May 2, 1967

3,317,730
DETERMINING ATMOSPHERIC POLLUTION BY THE DETECTION OF BACKSCATTERED INFRA-RED RADIATION
Cyril Hilsum, Malvern, England, assignor to National Research Development Corporation, London, England, a corporation of Great Britain
Filed Apr. 9, 1964, Ser. No. 358,422
Claims priority, application Great Britain, Apr. 17, 1963, 15,119/63
4 Claims. (Cl. 250—83.3)

This invention relates to the indication of fog or like atmospheric pollution.

According to the present invention, equipment for indicating the presence of fog or like atmospheric pollution comprises an infra-red radiation emitting semiconductor diode arranged to emit radiation into the atmosphere, energising means connected to supply modulated energising current to said diode, an infra-red detector arranged to be sensitive substantially only to said modulated radiation, and positioned to receive any radiation from the diode reflected back to the detector, shielding means disposed to shield said infra-red detector both from direct radiation from said diode and from direct sunlight, and indicating means for indicating the magnitude of the detected modulated radiation.

In use the equipment is positioned and orientated so that radiation scattered back from nearby objects is of as low a value as possible. In the presence of fog or like atmospheric pollution, the magnitude of the radiation scattered back to the detector increases, and this can be arranged to operate a suitable warning device when it exceeds a threshold level. Alternatively or in addition, the magnitude of the back-scattered radiation can be displayed on a meter.

A particularly convenient infra-red radiation emitting semiconductor diode that can be utilised in the invention is a gallium arsenide diode, which when forwardly biased emits radiation of about 9,000 A. In order to increase the sensitivity of the equipment the current through the diode is modulated, resulting in corresponding modulation of the infra-red output, and the detector is arranged to be sensitive only to the modulated frequency. This enables less power to be used for a given sensitivity to pollution and reduces the effect of spurious radiation reaching the detector.

In order that the invention may be more fully understood reference will now be made to the drawing accompanying this specification, the single figure of which illustrates an embodiment thereof.

Referring now to the drawing there is shown therein a gallium arsenide infra-red radiaiton emitting semiconductor diode 1 positioned within an opaque housing 2 provided with a lens 3 which beams the infra-red output from diode 1 into the atmosphere. The diode 1 is connected to energising means 8 which supplies modulated energising current to the diode 1. Positioned side by side to housing 2 is a further housing 4 provided with a silicon photocell 5 onto which any incident radiation is arranged to be beamed by means of a lens 6. The housing 4 constitutes shielding means for shielding the photocell 5 from direct radiation from the diode 1 and from direct sunlight.

The photocell 5 constitutes an infra-red detector which is connected to indicating means 9 for indicating the magnitude of the detected radiation. The indicating means 9 are connected by connecting means 10 to the energising means 8 and operate so that the detector 5 is sensitive only to the modulated frequency.

When the apparatus illustrated is directed into a clear atmosphere there will be little or no radiation from diode 1 which is received by photocell 5. However in the presence of fog indicated diagrammatically at 7 some of the radiation from diode 1 will be reflected back through lens 6 onto silicon photocell 5 and the output from photocell 5 can be readily arranged to operate a suitable warning device.

I claim:
1. Equipment for indicating the presence of fog or like atmospheric pollution, said equipment comprising:
   an infra-red radiation emitting semiconductor diode arranged to emit radiation into the atmosphere,
   energising means connected to supply modulated energising current to said diode,
   an infra-red detector arranged to be sensitive substantially only to said modulated radiation, and positioned to receive any radiation from the diode reflected back to the detector,
   shielding means disposed to shield said infra-red detector both from direct radiation from said diode and from direct sunlight, and
   indicating means for indicating the magnitude of the detected modulated radiation.

2. Equipment as claimed in claim 1 in which said semiconductor diode consists of a gallium arsenide diode forwardly biased to emit radiation of about 9,000 Angstroms.

3. Equipment as claimed in claim 1 in which said indicating means comprises means for indicating when the magnitude of the detected radiation is above a predetermined level.

4. Equipment as claimed in claim 1 in which said semiconductor diode and said detector are positioned adjacent one another and are arranged to emit and receive respectively infra-red radiation along substantially parallel axes.

References Cited by the Examiner
UNITED STATES PATENTS

| | | | |
|---|---|---|---|
| 2,237,193 | 4/1941 | Mobsby | 250—83.3 |
| 2,930,893 | 3/1960 | Carpenter et al. | 250—83.3 X |
| 2,977,477 | 3/1961 | Rosi et al. | 250—83.3 X |
| 3,198,012 | 8/1965 | Argue et al. | 250—83.3 X |

ARCHIE R. BORCHELT, *Primary Examiner.*